United States Patent

Ulyanov et al.

[11] 3,836,260
[45] Sept. 17, 1974

[54] QUICK RESPONSE ANGLE TRANSDUCER

[76] Inventors: Lev Petrovich Ulyanov, Eropkinsky pereulok, 7, kv. 6, Moscow; Alexei Kuzmich Karelin, Novomytischensky prospekt, 33, korpus 3, kv. 75, Moskivskoi oblasti, Mytischi both of U.S.S.R.

[22] Filed: May 8, 1973

[21] Appl. No.: 358,362

[52] U.S. Cl. .................. 356/152, 73/1 E, 250/230, 250/231 SE, 356/152
[51] Int. Cl. .......................................... G01b 11/26
[58] Field of Search ......... 250/230, 231 SE; 73/1 E; 356/141, 152

[56] References Cited
UNITED STATES PATENTS

| | | | |
|---|---|---|---|
| 2,136,682 | 11/1938 | Gilbert | 250/230 |
| 2,246,884 | 6/1941 | Johnson | 250/230 |

Primary Examiner—Maynard R. Wilbur
Assistant Examiner—S. C. Buczinski
Attorney, Agent, or Firm—Waters, Roditi, Schwartz & Nissen

[57] ABSTRACT

A quick-response transducer of angles of rotation of various members and devices about their axes comprising a mirror mounted on an axle, a collimated light beam source, a reflecting prism, two differentially connected photocells with a common load, a d.c. voltage amplifier, a galvanometer with mirror which is fixed by means of a holder to the galvanometer's movable frame and is optically associated with the axle-mounted mirror, the galvanometer being arranged in direct proximity to the axle-mounted mirror in order to extend the range of the measured angles of rotation of members and devices about their axes, wherein the movable frame of the galvanometer is coupled to the output of the d.c. voltage amplifier.

1 Claim, 2 Drawing Figures

QUICK RESPONSE ANGLE TRANSDUCER

The present invention relates to measuring equipment, and more particularly to quick-response transducers of angles of rotation of various members and devices about their axes.

The invention may be applied to instruments and devices wherein an angle transducer has to combine quick response with high resolution power and carry out linear conversion of an angle of rotation into an electric signal, for example, in torsion viscometers.

In the prior art, there is a transducer of angles of rotation of various members and devices about their axes comprising a light source, and axle-mounted mirror, a reflecting prism, two differentially connected photocells with a common load which are optically associated via the reflecting prism with the axle-mounted mirror, an amplifier connected to the common load of the two differentially connected photocells, a synchronous detector and a potentiometer.

The sensitivity of the prior-art transducer of angles of rotation of members and devices about their axes is less than one second of arc, whereas the range of angles under measurement is equal to ±1/6 of a degree.

A disadvantage of the prior-art angle transducer is the non-linearity of its amplitude response and a limited range of angles being measured.

It is an object of the present invention to provide a quick-response transducer of angles of rotation of various members and devices about their axes with a range of rotation angles being measured from ±3° to ±7°, and effecting linear conversion of angles of rotation into an electric signal over the entire range of angles of rotation under measurement.

The invention resides in that a quick-response transducer of angles of rotation of various members and devices about their axes comprising an axle-mounted mirror, a collimated light beam source optically associated with the axle-mounted mirror, a reflecting prism, two differentially connected photocells with a common load, which are optically associated via the reflecting prism with the axle-mounted mirror, and a d.c. voltage amplifier connected to the common load of the two differentially connected photocells. There is provided, according to the invention, a galvanometer having a mirror which is fixed by means of a holder to a movable frame of the galvanometer, which follows the rotation of the movable frame of the galvanometer and is also optically associated with the axle-mounted mirror, wherein the galvanometer is arranged in direct proximity to the axle-mounted mirror in order to extend the range of measured angles of rotation of members and devices about their axes, and wherein the movable frame of the galvanometer is connected to the output of the d.c. voltage amplifier.

The use of the proposed quick-response transducer of angles of rotation of various members and devices about their axes permits of linear conversion of angles of rotation in the order of ±(3° - 7°) into an electric signal.

The invention will now be explained in greater detail with reference to an embodiment thereof taken in conjunction with the accompanying drawings, wherein.

Figure 1:
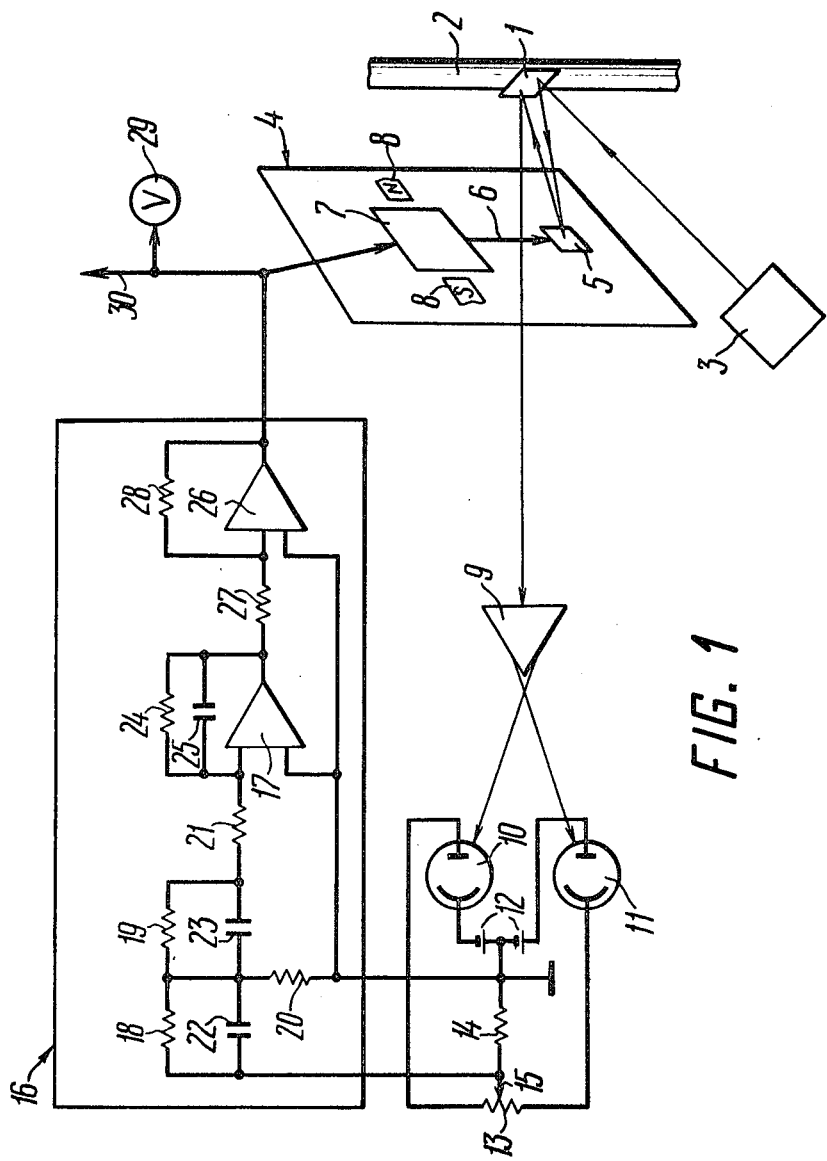
FIG. 1 is an optoelectric diagram of a quick-response angle transducer, in accordance with the invention.

The proposed quick-response transducer of angles of rotation of various members and devices about their axes comprises a mirror 1 (FIG. 1) mounted on an axle 2, a collimated light beam source 3 optically associated with the mirror 1 mounted on the axle 2, a galvanometer 4 with a mirror 5 which is fixed by means of a holder 6 to a movable frame 7 of the galvanometer 4 and follows the rotation of the movable frame 7 of the galvanometer 4, the frame being placed in a uniform field of a permanent magnet 8, and the mirror 5 being optically associated with the mirror 1 mounted on the axle 2; the galvanometer 4 is arranged in direct proximity to the mirror 1 mounted on the axle 2 in order to extend the range of measured angles of rotation of members and devices about their axes.

The quick-response angle transducer also has a prism 9 made at a critical angle, two differentially connected photocells 10 and 11 attached by a collimated light beam from the soruce 3, which beam is reflected by the mirror 1 and passes through the prism 9. A d.c. voltage source 12 with a central top is coupled to the two differentially connected photocells 10 and 11 which are loaded in a common potentiometer 13 for flattening out the conversion transconductance characteristic of the photocells 10 and 11, and a resistor 14 is connected to a cursor 15 of the potentiometer 13 and to the central tap of the d.c. voltage source 12.

The potentiometer 13 and the resistor 14 make up a common load of the two differentially connected photocells 10 and 11.

Coupled to the common load of the two differentially connected photocells 10 and 11 is a d.c. voltage amplifier 16 comprising an operational amplifier 17 with an input amplitude-and-phase correction circuit connected to the resistor 14 and incorporating resistors 18, 19, 20 and 21 and capacitors 22 and 23, and with a resistor 24 and a capacitor 25 in its feedback circuit.

The d.c. voltage amplifier 16 also has an operational amplifier 26 with a resistor 27 in its input circuit, which resistor is connected to the output of the operational amplifier 17, and with a resistor 28 in its feedback circuit.

Connected to the output of the d.c. voltage amplifier 16 are the movable frame 7 of the galvanometer 4 and a voltmeter 29. There is also an output 30, the voltage across which is proportional to an angle of rotation of the axle 2.

The proposed quick-response transducer of angles of rotation of various members and devices about their axes operates as follows:

A collimated light beam sent by the source 3 is reflected by the mirror 1 mounted on the axle 2 to the mirror 5 of the galvanometer 4. The mirror 5 reflects the beam back to the mirror 1. The beam is again reflected by the mirror 1 to the reflecting prism 9 made at a critical angle.

Figure 2:
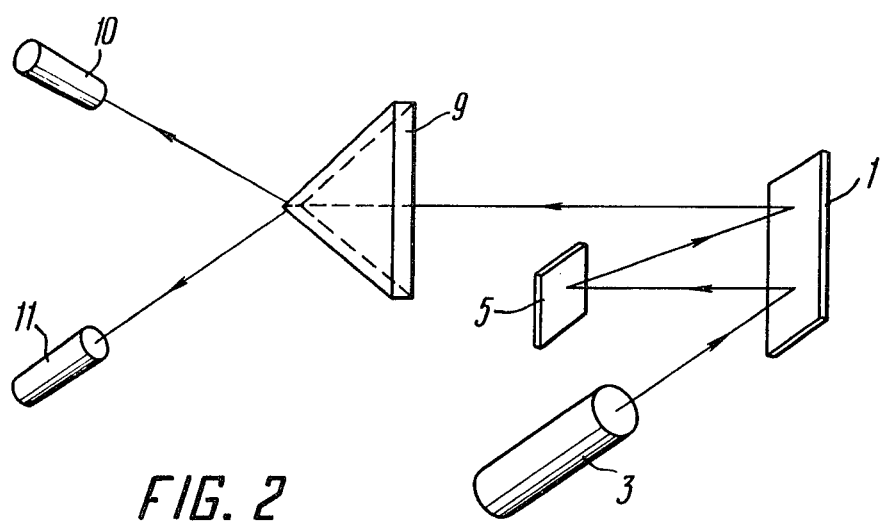
FIG. 2 is an isometric representation of the optical part of the quick-response angle transducer circuitry, in accordance with the invention.

In the initial (zero) position of the axle 2, the collimated light beam is reflected back by the prism 9, and the photocells 10 and 11 are thus dimmed. Following a rotation of the axle 2, the light beam passes partially through the prism 9 to the photocell 10 or 11, depending on the sense of the rotation of the axle 2. A clearer idea of this process can be had from FIG. 2 which is an isometric representation of the passage of the light beam from the source 3 to the photocells 10 and 11. Across the resistor 14, there appears a voltage which is proportional to the photocurrent through the illuminated photocell 10 or 11. This voltage is amplified by the d.c. voltage amplifier 16, comprising the operational amplifiers 17 and 26, and is then applied to the movable frame 7 of the galvanometer 4. As a result, a current flows through the movable frame 7 of the galvanometer 4, which interacts with the uniform field of the permanent magnet 8 and produces a torque which turns the movable frame and the mirror 5 of the galvanometer 4 in the direction of the reduction of the displacement angle between the mirror 5 and the mirror 1, thereby following up the angle of rotation of the mirror 1 and, consequently, of the axle 2. The photocells 10 and 11, the d.c. voltage amplifier 16 and the galvanometer 4 make up a feedback circuit through which passes a signal of correction of the displacement angle between the mirror 1 and the mirror 5. The displacement angle between the mirror 1 and the mirror 5 is ($k$ + 1) times less than the angle of displacement of the mirror 1 with respect to its initial position, where $k$ is the amplification factor of the feedback circuit. The amplification factor $k$ of the feedback circuit has a value of the order of magnitude of several thousand, thus, an eventual instability of the light source practically does not affect the accuracy of measurement. The range of angles of rotation being measured is determined by the size of the mirror 1 and the mirror 5, as well as by the distance there between, hence, the galvanometer 4 is arranged in direct proximity to the mirror 1. The range of angles under measurement has a value in the order of $\pm(3° - 7°)$. The linearity of the amplitude response of the transducer is determined by the linearity of the galvanometer 4.

The angle of rotation of the mirror 5 is proportional to the voltage applied to the movable frame 7 of the galvanometer 4 and measured by the voltmeter 29 which is graduated in angular values. To connect other measuring instruments provision has been made for the output 30 of the d.c. voltage amplifier 16, the voltage across which is proportional to the angle of rotation of the mirror 5 and, consequently, that of the axle 2.

The amplitude-and-phase correction circuit comprising the resistors 18, 19, 20, 21 and the capacitors 22, 23, and the amplitude-and-phase correction circuit comprising the resistor 24 and the capacitor 25, serve to raise the accuracy of the following by the mirror 5 of the galvanometer 4 of the angle of rotation of the mirror 1 mounted on the axle 2.

The proposed quick-response transducer of angles of rotation of various members and devices about their axes makes it possible to effect linear conversion of an angle of rotation into an electric signal with a high resolution power for a range of angles of rotation of no less than three degrees.

What is claimed is:

1. A quick-response transducer of angles of rotation of various members and devices about their axes, comprising a mirror mounted on an axle; a collimated light beam source optically associated with said mirror mounted on said axle; a reflecting prism; two differentially connected photocells with a common load, which are optically associated via said reflecting prism with said mirror mounted on said axle; a d.c. voltage amplifier with an input and an output, the input of said amplifier being connected to the common load of said two differentially connected photocells; a galvanometer with a holder, a movable frame and a mirror fixed by means of said holder to said movable frame of said galvanometer; said mirror following the rotation of said movable frame and being optically associated with said mirror mounted on said axle; said galvanometer being arranged in direct proximity to said mirror mounted on said axle, in order to extend the range of the measured angles of rotation of said members and devices about their axes; said movable frame being connected to said output of said d.c. voltage amplifier.

* * * * *